United States Patent [19]
Dynie et al.

[11] Patent Number: 6,038,314
[45] Date of Patent: Mar. 14, 2000

[54] PLUG-IN ACCESSORIES

[75] Inventors: Ernest R. Dynie, Nepean; Paul John Koens, Ashton; John Irving Johnson, Kinburn, all of Canada

[73] Assignee: Nortel Networks Corporation, Montreal, Canada

[21] Appl. No.: 09/028,519

[22] Filed: Feb. 23, 1998

[51] Int. Cl.[7] .................................................. H04M 1/00
[52] U.S. Cl. ............................................ 379/435; 428/436
[58] Field of Search .................................. 379/428, 435, 379/436, 447, 454

[56] References Cited

U.S. PATENT DOCUMENTS

| | | | |
|---|---|---|---|
| 4,790,007 | 12/1988 | Richter et al. | 379/428 |
| 5,414,768 | 5/1995 | McKinnen et al. | 379/428 |
| 5,862,214 | 1/1999 | Aggus et al. | 379/435 |

*Primary Examiner*—Jack Chiang

[57] ABSTRACT

The characteristics of a desktop telephone terminal can easily be enhanced or modified with the use of external devices such as personal computers. Different types of accessory interface cartridges are used for the different types of external devices. To facilitate attachment of the interface cartridges both electrically and mechanically, a stand is provided for supporting the terminal at different desired tilted positions and an accessory connection module (ACM) is mounted in the stand. The ACM has an electrical connection to the underside of the terminal and has one or more electrical connectors which are aligned with apertures in the stand. These apertures are accessible when the terminal is on the stand and permit plugging in of one or more of the cartridges.

33 Claims, 7 Drawing Sheets

PLUG-IN ACCESSORIES

RELATED APPLICATIONS

This application is related in subject matter to two U.S. applications filed on even date. The first is entitled "Tilt Stand for a Desktop Terminal", inventors M. Brown, E. Dynie, J. I. Johnson and D. Chadwick and applicant's reference number 71493-330. The second is entitled "Display-Based Add-On Module", inventors J. I. Johnson, P. J. Koens and D. Boggia and applicant's reference number 71493-327.

FIELD OF INVENTION

The invention relates to desktop terminals and is particularly concerned with an arrangement allowing easy interchangeability of accessories.

BACKGROUND OF THE INVENTION

A user of a desktop terminal such as a telephone terminal, for example, may desire to modify or enhance the functional capabilities and/or features of the terminal for example by attaching a personal computer to the terminal.

Currently, desktop terminals are usually configured by manufacturers to deliver the full range of design features. To better serve the needs of end users, the functionality and/or features often need to be modified by telephone service providers on customer premises. In other cases end users are required to order specific electronic modules to acquire a desired range of features and capabilities.

The alterations of telephone set characteristics are typically made possible by intrusion into the body of the terminal. The modifications of functionality are, therefore, usually performed on the customer's premises by trained technicians.

The costs associated with modifications of functional capabilities and/or features of the terminal can be significant and are usually passed onto the subscriber.

SUMMARY OF THE INVENTION

It is the object of the invention to obviate or mitigate one or more of the above indicated problems which are usually associated with modifying the characteristics of a desktop terminal.

According to a first broad aspect, the invention provides a stand for supporting a desktop terminal and permitting interconnection of an accessory interface cartridge to the terminal, wherein the stand comprises: at least one first aperture, accessible when the terminal is located on the stand, for reception of at least a portion of the cartridge; and a second aperture for securing an accessory connection module (ACM) to the stand and in general alignment with the first aperture, whereby the ACM interconnects the terminal with the cartridge.

According to a second broad aspect, the invention provides in combination, a stand for supporting a desktop terminal and an accessory connection module (ACM) permitting interconnection of an accessory interface cartridge to the terminal, wherein the stand comprises at least one first aperture, accessible when the terminal is located on the stand, for reception of at least a portion of the cartridge and a second aperture for securing the ACM to the stand and in alignment with the first aperture; and wherein the ACM comprises at least one first electrical connector, a second electrical connector and electrical conductors extending between the first and second electrical connectors, the first electrical connector being mateable with a complementary electrical connector on the cartridge when received in the first aperture of the stand and the second electrical connector being mateable with a complementary electrical connector on the terminal when mounted on the stand.

According to a third broad aspect, the invention provides an accessory connection module (ACM) for receipt in a support stand for a desktop terminal thereby to permit interconnection of an accessory interface cartridge to the terminal, wherein the ACM comprises at least one first electrical connector, a second electrical connector and electrical conductor extending between the first and second electrical connectors, the first electrical connector being mateable with a complementary electrical connector on the cartridge and the second electrical connector being mateable with a complementary electrical connector on the terminal when inserted on the stand.

According to a fourth broad aspect, the invention provides in combination, a stand for supporting a desktop terminal, an accessory interface cartridge for the terminal and an accessory connection module (ACM) permitting interconnection of the cartridge to the terminal, wherein the stand comprises at least one first aperture, accessible when the terminal is located on the stand, for reception of the cartridge and a second aperture for securing the ACM to the stand and in alignment with the first aperture; wherein the ACM comprises at least one first connector, a second electrical connector and electrical conductors extending between the first and second electrical connectors; and wherein the cartridge has an electrical connector which is mateable with the first electrical connector when the cartridge is received in the first aperture and has a further electrical connector for connection of the cartridge to an external device; whereby the second electrical connector may be mated with a complementary electrical connector on the terminal to interconnect the cartridge to the terminal.

Advantages of this invention include allowing the user the freedom to change the characteristics of the desktop terminal by way of an interchangeable modular cartridge or cartridges without the need for intrusion into the terminal.

BRIEF DESCRIPTION OF THE DRAWINGS

A preferred embodiment of the invention will now be described with reference to the attached drawings in which:

FIG. 3b is a front perspective view of the stand shown in FIG. 3a;

DETAILED DESCRIPTION OF THE PREFERRED EMBODIMENT

Figure 1:
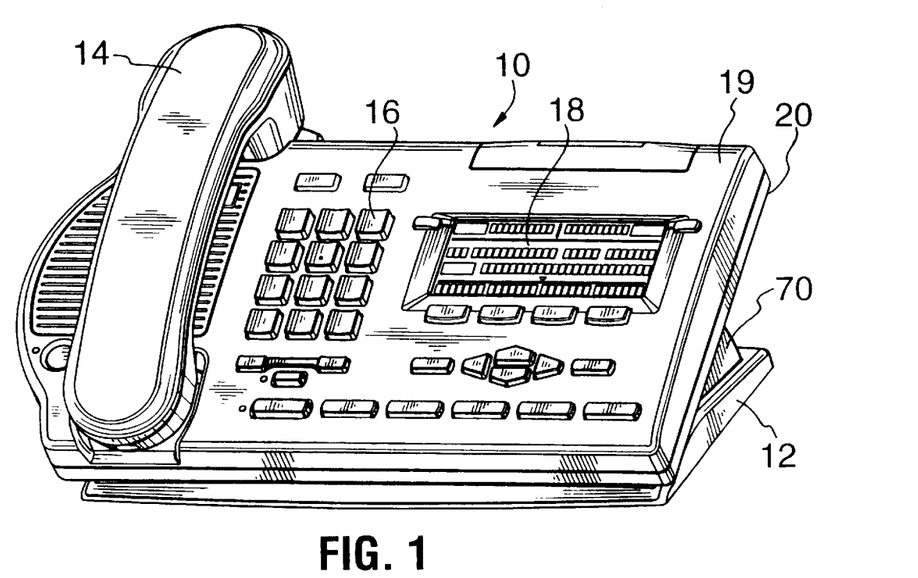
FIG. 1 is the front perspective view of a telephone terminal on a stand.
Figure 2:
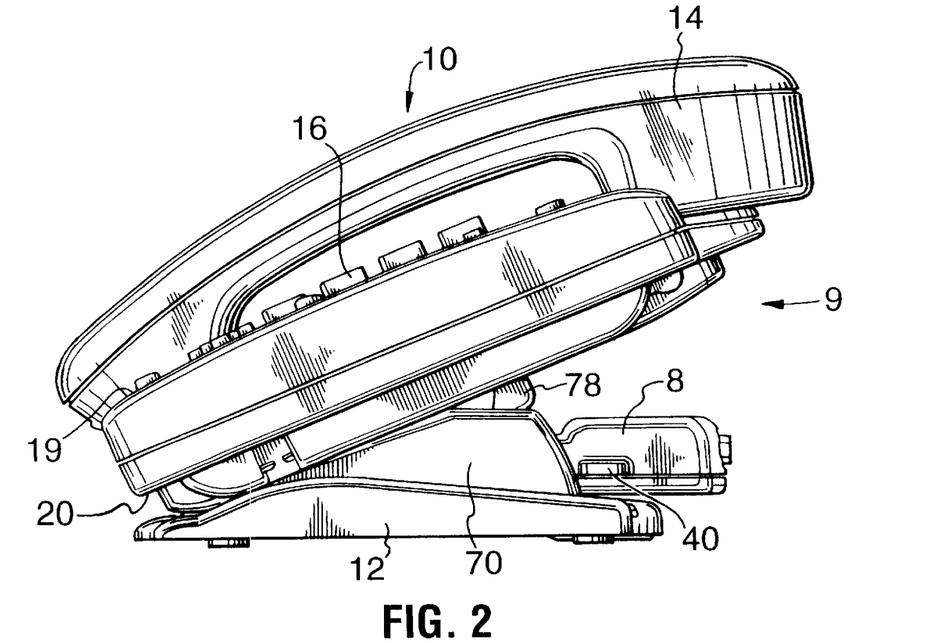
FIG. 2 is a side view of the terminal on the stand, and an accessory cartridge module.
Figure 7:
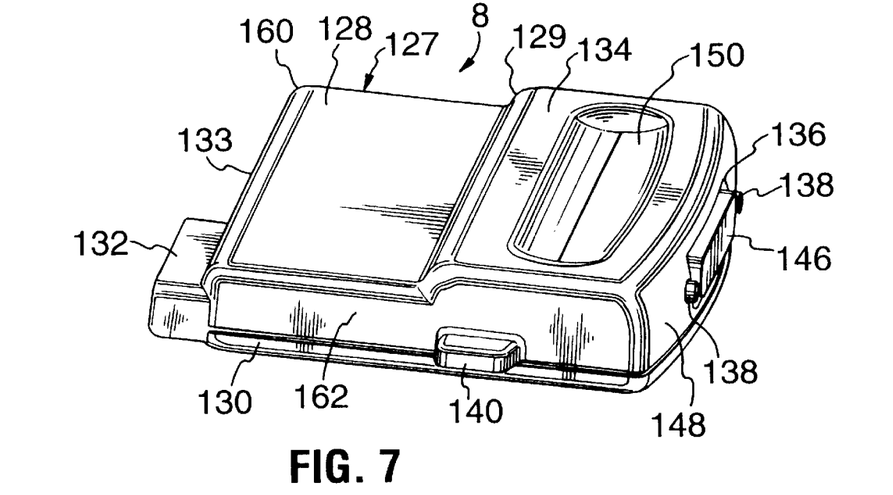
FIG. 7 is a top perspective view of a cartridge module.
Figure 8:
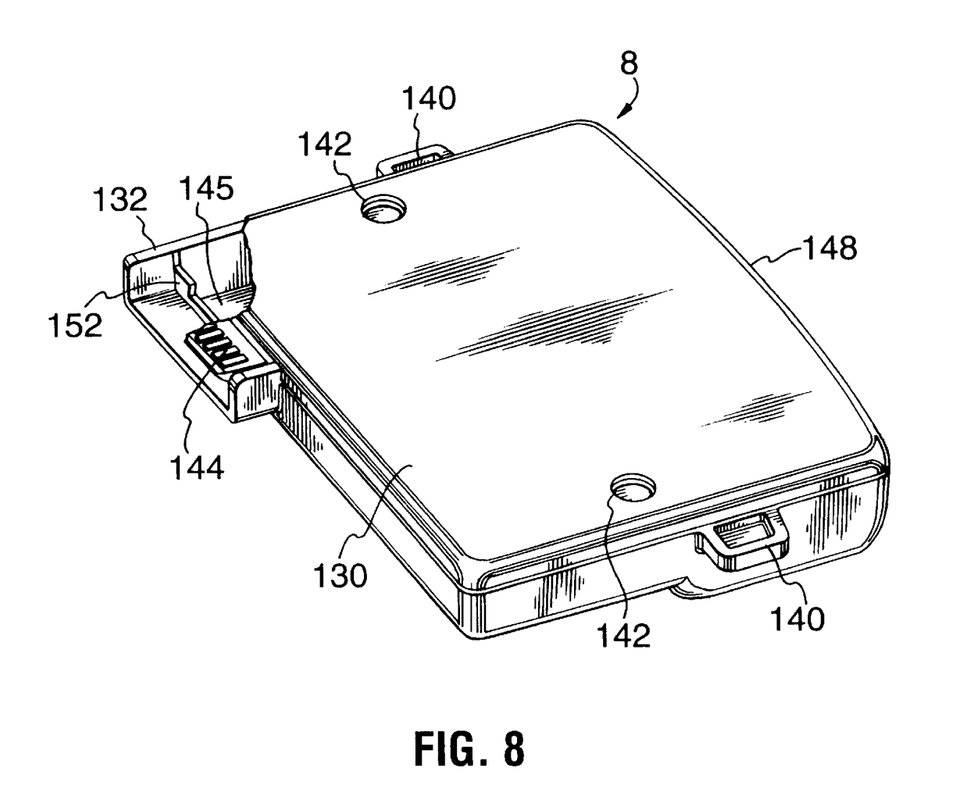
FIG. 8 is a bottom perspective view of the cartridge module with a partial cut-out of the bottom plate.

The invention involves a technique for interconnecting an external device or accessory such as a personal computer using an accessory interface module or cartridge 8, illustrated most clearly in FIGS. 7 and 8, with a desktop telephone terminal 10, illustrated most clearly in FIG. 1. The technique makes use of an Adaptor Connection Module (ACM) 11, illustrated most clearly in FIGS. 5 and 6, which is adapted to be mounted in a stand 12, illustrated most clearly in FIGS. 2 to 4, upon which the telephone terminal 10 rests. The stand 12 is designed to rest on a flat surface such as a desktop and support the terminal at a specific angle selected from a number of possible angles of inclination. The way in which the stand and terminal inter-relate to provide this function is the subject of the above identified U.S. patent application entitled "Tilt Stand for a Desktop Terminal", the disclosure of which is incorporated by reference herein. The description of the functional relationship between the terminal and the stand will be repeated herein only in as much detail as is necessary for a complete understanding of the present invention.

The telephone terminal 10, as shown in FIG. 1, typically includes a handset 14, numerous keys 16, a display 18 and a body housing electrical/electronic components and is forming an upper surface 19 and a lower surface 20. The lower surface 20 is better detailed in FIG. 3a from which it can be seen that left of centre of the top edge of the lower surface 20 is formed a rectangular opening 60. Recessed in the opening is a connector (not visible) which is provided there to mate with a connector 46 shown in FIG. 5 (and which will be discussed later). Two narrow channels 62 with four small openings 58 are formed in a shallow niche 64, aligned with the opening 60, to accommodate mechanical interface with a protective cover 28 housing a ribbon cable 54 as illustrated in FIGS. 4, 5 and 6.

Figure 3:
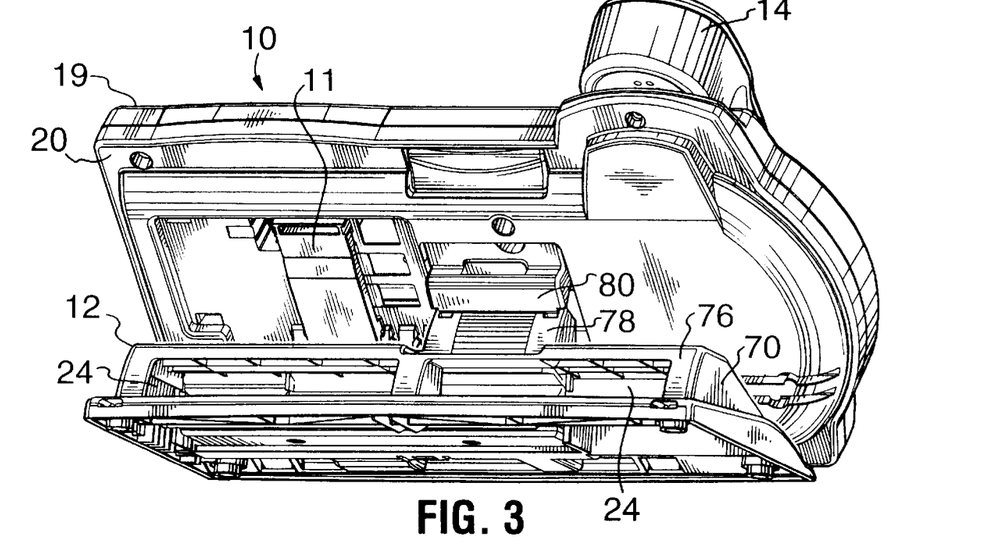
FIG. 3 is a rear perspective view, looking from below and drawn to a larger scale, of the terminal and the stand and showing a portion of an Accessory Connection Module (ACM) assembly.
Figure 3A:
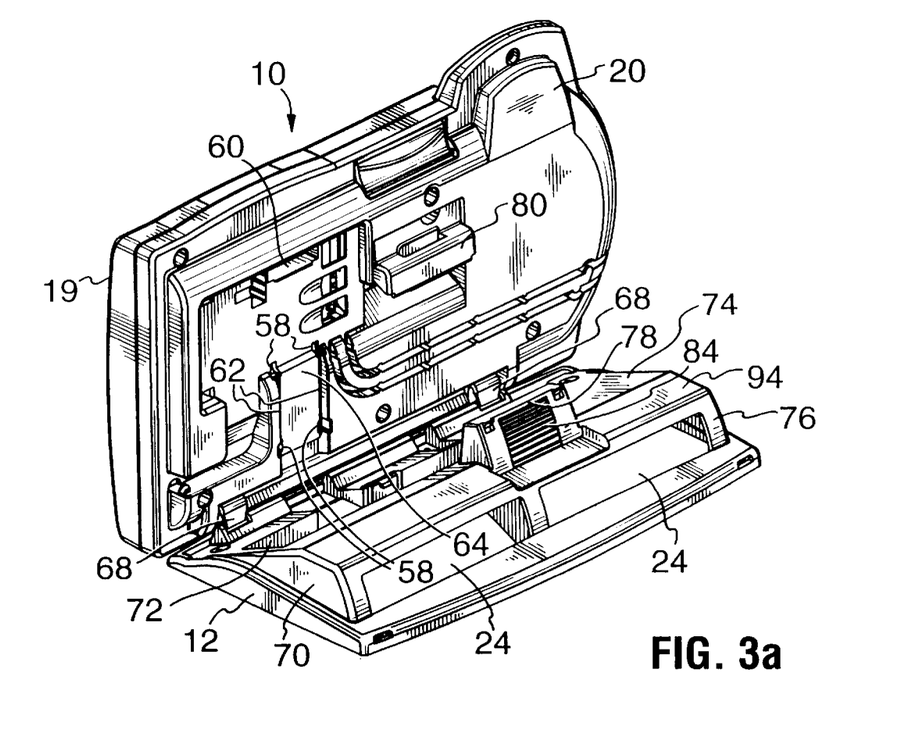
FIG. 3a is a rear perspective view of the terminal and the stand looking from above and with the terminal pivoted out of latching engagement with the stand to expose details of the underside of the terminal.
Figure 3B:
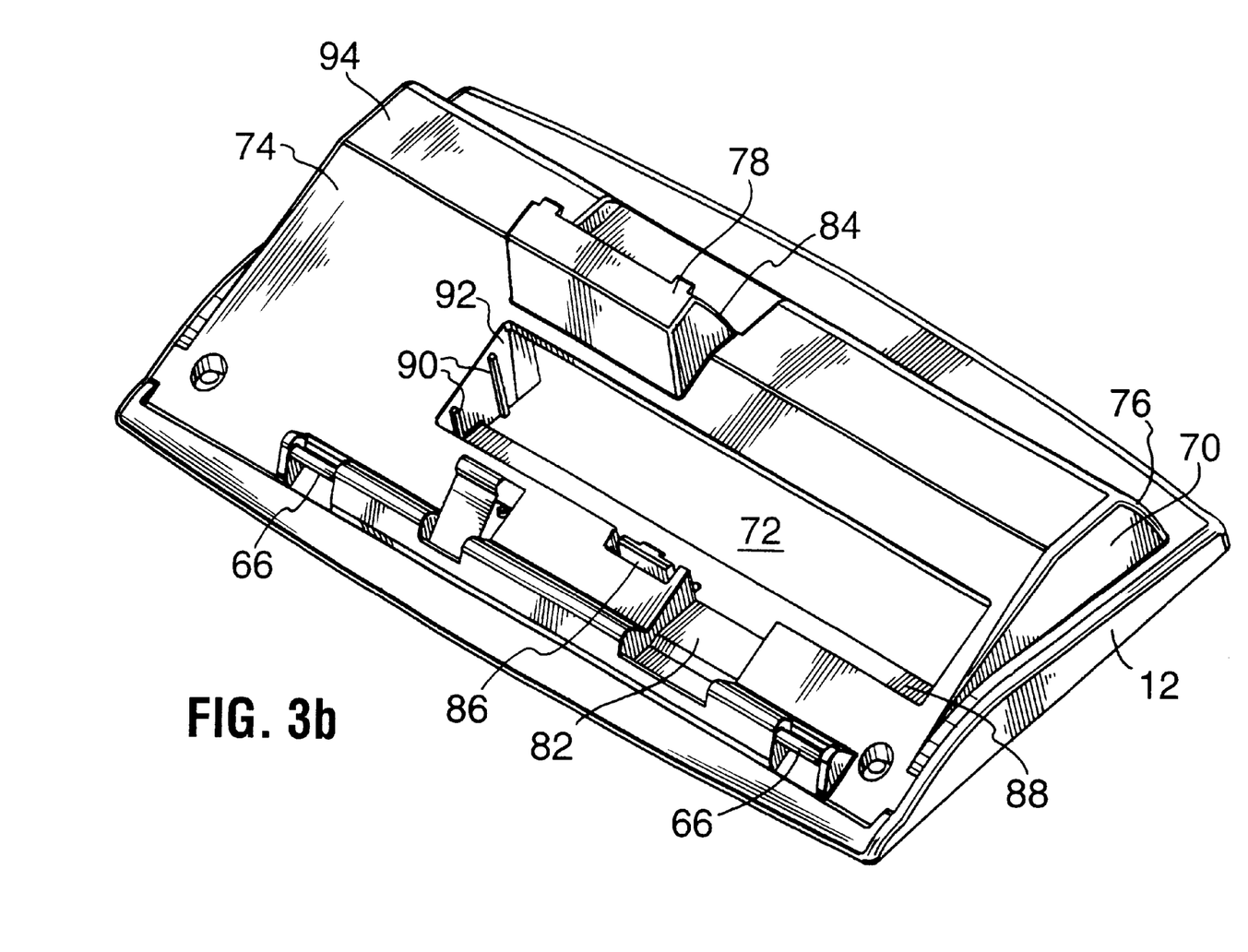

Referring again to FIG. 3 and FIG. 3a the terminal 10 is shown mounted on the stand 12, also illustrated in detail in FIG. 3b. The stand has a generally rectangular base which projects upwardly in a primary raised body 70. This body is formed with a sloping surface 74 rising from the front of the base, having a rectangular opening 72 formed therein, a flat surface 94 at the top of the primary raised body 70 and a rear, nearly vertical slightly convex surface 76 having two rectangular openings 24 formed therein and visible in FIG. 3a. A tilt unit 78, rising from the top surface 94, projecting generally upwardly from the stand 12, has serrations 84 molded in its rear face allowing engagement with a locking member 80 illustrated in FIG. 3a in a range of tilted elevations. Opening 72 in the frontal sloping surface 74 is formed with two spaced sides 92 extending down to a floor 88 which extends between the sides but only at a forward location. The floor 88 is substantially co-planar with the base and communicates with the opening extending frontwards to form a shallow channel 82 formed in the sloping surface 74. Located generally centrally and adjacent to the shallow channel 82 is an upwardly projecting latch 86 molded as a part of the floor 88. The vertical sides 92 of the opening 72, one of which is visible in FIG. 3b, have each two vertical ribs 90 formed therein. As will be described later in greater detail, these features are provided to aid the introduction, positioning and locking in place of the ACM module by which the interconnection between the terminal and the cartridge is achieved.

As can be seen in FIG. 3a, located relatively near the right and left extremity and towards the bottom edge of the lower surface 20 of the terminal are located two pivot prongs 68. Near the front of the stand 12, as can be seen in FIG. 3b, are formed two pivot rods 66, spaced apart and each located relatively near opposite sides of the stand. These, in combination with the two pivot prongs 68, and with the locking member 80 and the serrations 84 molded in the tilt unit 78 allow tilting and locking of the terminal in an elevation comfortable to the user, or when desired, allow complete disengagement of the terminal from the stand. This function is described more completely in the above identified patent application entitled "Tilt Stand for a Desktop Terminal".

Figure 4:
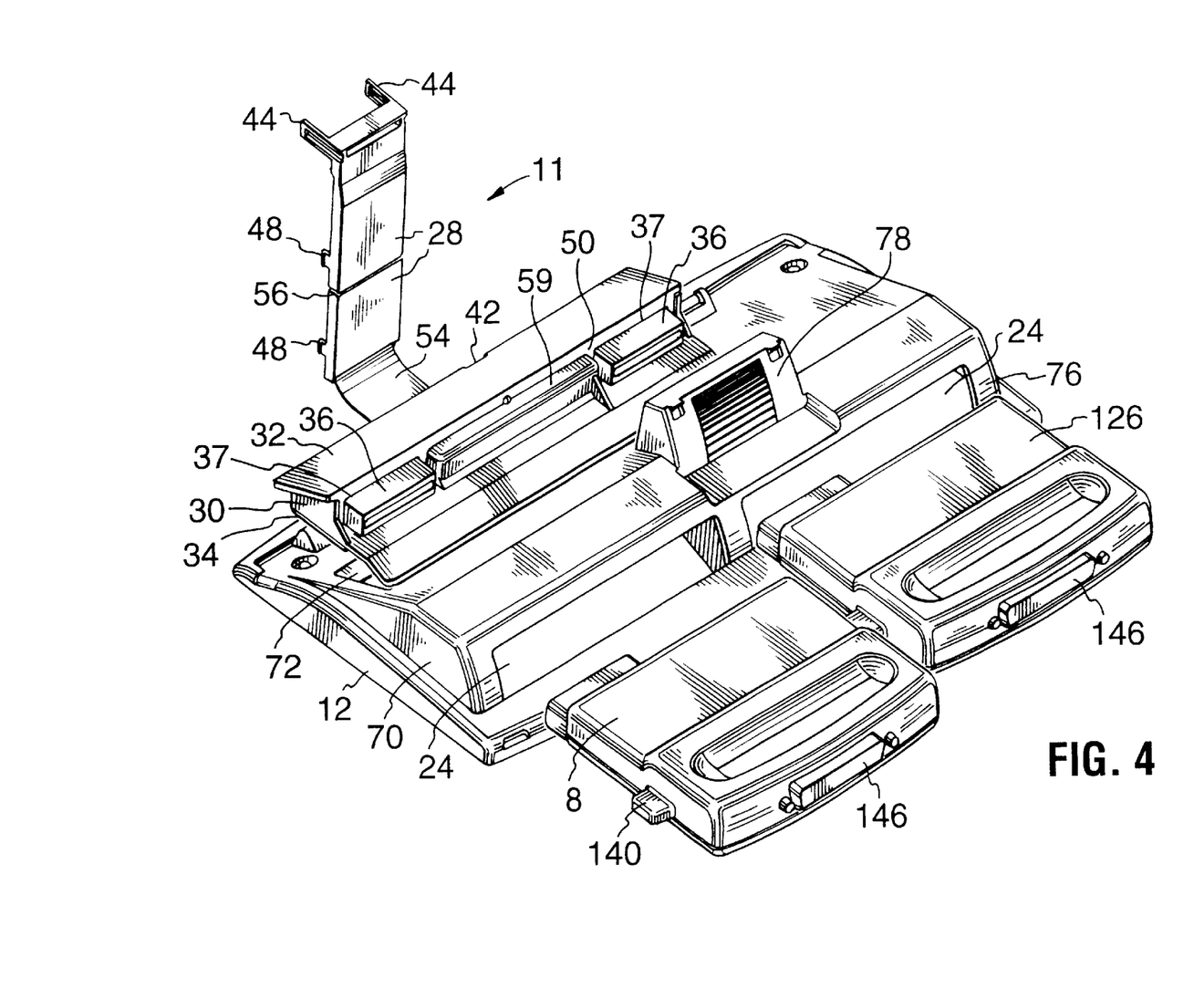
FIG. 4 is an exploded rear perspective view of an Accessory Connection Module (ACM) assembly, the stand and two cartridge modules.
Figures 5, 6:
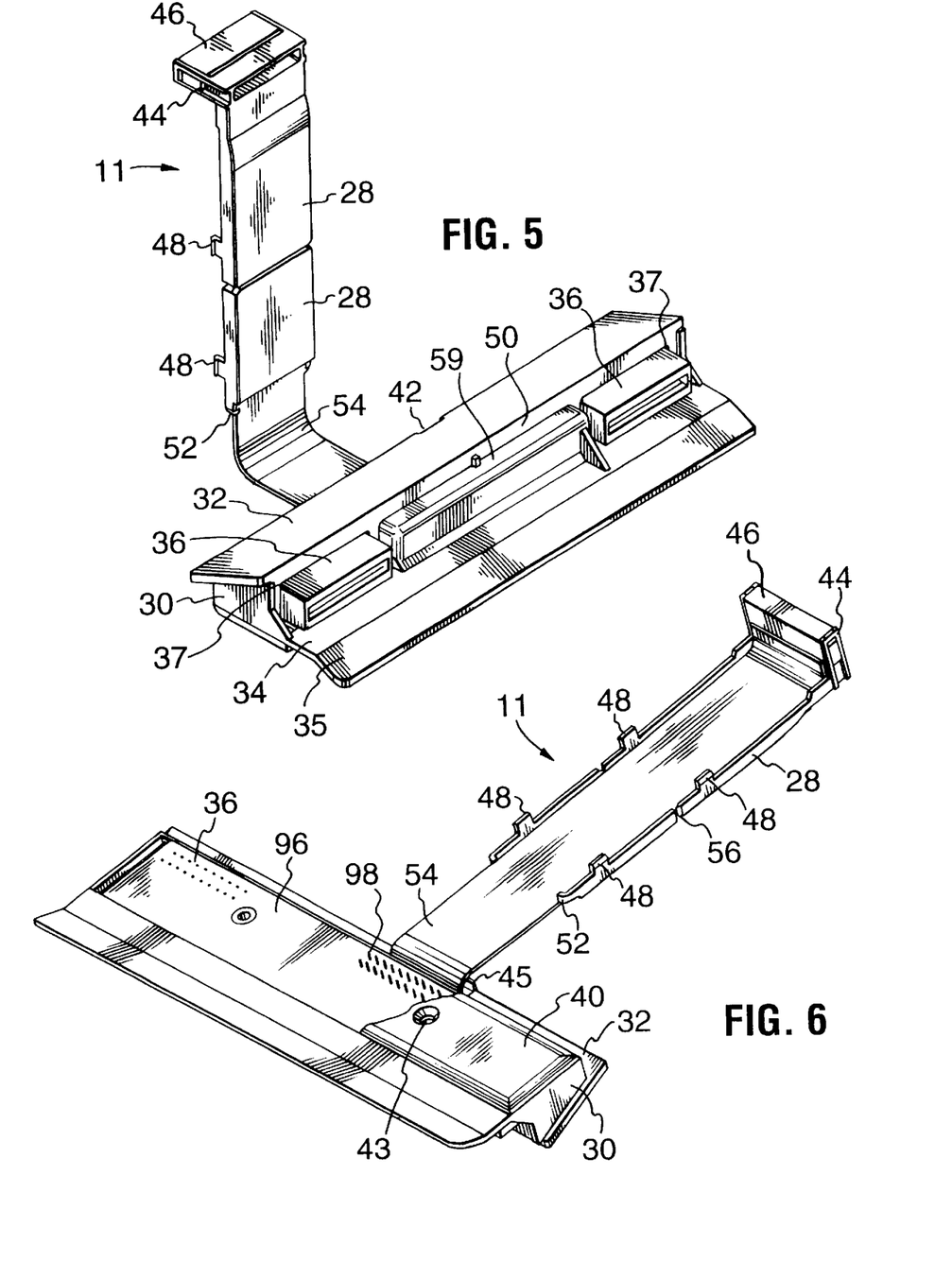
FIG. 5 is a top perspective view of the ACM assembly.
FIG. 6 is a bottom perspective view of the ACM assembly.

The ACM 11, illustrated in FIG. 3, and in greater detail in FIGS. 4, 5 and 6, provides the necessary mechanical interlock and flexible electrical interconnection between the terminal 20 resting on the stand 12, as shown in FIG. 3, and the cartridges 8 inserted in the stand 12 as seen in FIG. 4.

The ACM 11 comprises three parts, namely a main interface body 30, a ribbon cable 54 and a protective cover 28 for the ribbon cable 54. Firstly, the main interface body 30 will be described with references to FIGS. 5 and 6.

The main interface body 30 is generally rectangular and has a top planar surface 32 and a bottom planar surface 34. The bottom planar surface is substantially horizontal and the top planar surface 32 slopes upwardly towards the front 50 of the body 30. The top planar surface 32 extends slightly beyond the sides and rear of the ACM. A lip surface 35 extends frontwardly from the bottom planar surface 34 and slopes downwardly from the surface 34 to form a guiding mouth. A small elongated rectangular indentation 42 is provided on the rear facing edge of the top planar surface 32 of the main interface body 30 and is made to align with the previously described latch 86 provided in the stand 12. A raised rectangular bridge 59, formed symmetrically between two openings 37 in the front 50 serves as a control means when the assembly 30 is inserted in and extracted from the stand 12.

The two openings 37 formed in the front 50 of the main interface body 30 in FIG. 5 are provided to accommodate respectively electrical connectors 36 which are of an appropriate type to facilitate electrical interface to a respective cartridge 8 shown in FIGS. 7 and 8.

Attached to the bottom planar surface 34 in FIG. 5 is a bottom plate 40 shown in FIG. 6 featuring two circular openings 43 to receive two screws. The bottom plate covers a narrow PWB strip 96 to which the two connectors 36, and a ribbon cable connector 98 (the underside visible in FIG. 6) are electrically connected. The conductors formed on the narrow strip 96 can have a variety of layouts to facilitate various interconnections between the ribbon cable connector 98 and the connectors 36.

Located on the underside of the planar surface 32 is shown a lip 45 extending under the ribbon cable 54. The lip 45 is provided to minimize stress on the ribbon cable caused by bending when the terminal 10 is lowered or raised on the stand.

In its overall dimensions the main interface body 30 is made compatible with the large opening 72 in the stand 12 which can be best seen in FIG. 3a. The relative position of the interlocking arrangement 30 and the stand 12 is best illustrated in FIG. 4.

An electrical connector 46 terminates the free end of the ribbon cable 54 and, as seen in FIG. 5, is held in the protective cover 28 by two small protrusions 44 extending outwards at a right angle from the cover. The protrusions each have a small rectangular opening formed therein to accommodate the sides of the connector 46 which terminates the end of the ribbon cable 54.

The protective cover 28 forms a shallow channel, best visible in FIG. 6, in which the ribbon cable 54 rests, being held in place by two small inward facing curved extrusions 52.

The length of the protective cover 28 is divided into two detachable sections by a break-off line 56.

In the sides of each of the two section of the protective cover 28 are formed two snap-in latches 48. The location of these corresponds to the four small rectangular openings 58 formed in the lower surface 20 of terminal 10 in the two narrow channels 62 running through the niche 64 as seen in FIG. 3a.

The cartridges 8 will be discussed next with references to FIGS. 4, 7 and 8. The cartridge houses Printed Wiring Board (PWB) mounted circuitry required to interface with an appropriate external device so as to modify the performance of the desktop terminal.

It is envisaged that two, three or more different types of cartridge will be produced for use respectively with different types of external devices. For example, one type of cartridge known as CTIA (Computer Telephony Integration Adapter) is intended for hooking up to a personal computer which is provided with appropriate software for extending or enhancing the directory of the telephone terminal, managing calls, providing enhanced screen displays and so on. This cartridge will contain the necessary RS232 drivers for interfacing with the computer.

Another type of cartridge, known as MCA-P (Meridian Connector Adapter—Pangaea) will have the required electronic circuitry for hooking up with a digital modem.

A third type of cartridge, known as ATIA (Analog Terminal Interface Adapter) will contain the required circuitry for interfacing with an analog device such as a fax or an analog modem.

The circuitry contained in the cartridges for carrying out those interface functions is well known to those skilled in the art and, as it forms no part of the invention, will not be described herein. It should be noted that, although the circuitry for each type of cartridge is different, the external configuration of the cartridges is identical except in respect of two important details which will be described below.

The cartridge module, generally rectangular in shape and molded in plastic, is formed as an upper housing 127 and a bottom plate 130. A label identifying the cartridge type may be fixed to the bottom plate 130. The upper housing 127 has a first upper surface 128 interconnected by a step 129 to a second, higher, upper surface 134. A shallow curved depression 150 spanning almost the entire width of the cartridge is provided in upper surface 134. A rectangular protrusion 132 extends from a rear surface 133 of the cartridge.

The front of the cartridge is formed as a slightly convex surface 148, which features two small circular openings 138 and one large rectangular opening 136. The rectangular opening 136 is used to accommodate a connector 146 to facilitate electrical connection to an external device such as a personal computer (not shown).

The two small round openings 138 accommodate mounting studs of the connector 146 and could be also used to restrain an extension cable (not shown) connecting the cartridge to the external device.

The view of the bottom plate 130 of the cartridge 8 is shown in FIG. 8. It generally forms a rectangle with one side slightly arched to conform to the shape of the slightly convex side 148 of the housing 127. The rectangular protrusion 132 formed in the cartridge module 8 is not covered by the bottom plate 130 but is left open exposing an edge finger connector 144 formed on a PWB 145 retained in the housing. The edge finger connector extends outwardly from the cartridge, almost to the extent of the rectangular protrusion 132, and is protected from the top by the rectangular protrusion 132. Two small circular openings 142 are formed in the bottom plate 130 to accommodate screws by which the upper housing 127 and the bottom plate 130 are held together.

On each side 162 of the cartridge module 8 is a small rectangular key 140 extending outwards from the sides.

The keys 140 project a predetermined distance from the cartridge sides, have a predetermined thickness and are located at a predetermined height above the bottom plate 130. The only external difference between the three types of cartridge referred to above, apart from the fact that a different type of connector 146 is required for connection to a different type of external device, is that the keys in the second cartridge type, i.e. the MCA-P cartridge, are located higher than the keys of the first type, i.e. the CTIA cartridge, and the keys on the third cartridge type, i.e. the ATIA cartridge, are located higher than the keys of the second cartridge type. Typically, the keys of the second cartridge type are located 5 mm higher than the keys of the first cartridge type and the keys of the third cartridge type are located 5 mm higher than the keys of the second cartridge type. The thickness of the keys is less than the difference in height between the first and second cartridges, say 4 mm.

The functionality of the invention will now be explained.

With the terminal 10 disengaged from the stand 12 the main interface body 30 of the ACM, can be introduced into the rectangular opening 72 of the stand 12 as shown in FIG. 4. The main interface body 30 is laterally inserted in the rectangular opening 72 while being guided in position by the two ribs 90 formed in the sides 92 until the slightly extended top planar surface 32 of the ACM almost meets with the surface 74. The body 30 of the ACM can then be pivoted into position while being supported and guided by the raised rectangular bridge 59. The latch 86 is received in the small rectangular indentation 42 thus locking the main interface body 30 in the stand 12. The bottom planar surface 34 rests on the floor 88.

The two pivot prongs 68 of the terminal can then be coupled with the two pivot rods 66 of the stand and the assembly can be rotated approximately to the position indicated in FIG. 3a. The connector 46 of the ACM can then be inserted in the opening 60 in FIG. 3a and mated with the corresponding connector inside the body of terminal 10 and the snap-in latches 48 formed on the sides of the protective cover 28 can be inserted and latched in the small openings 58 in FIG. 3a. When the sides of the protective cover 28 are admitted in the two narrow channels 62 on the terminal, the ribbon cable and the cover rest in the shallow niche 64 and the ribbon cable 54, can be positioned in the shallow channel 82. If required, the length of the protective cover can be shortened by breaking off at the break-off line and the redundant section of the cover can be removed. The excess cable can be folded away under the body 20 of the terminal.

The terminal 10 can then be pivoted down to engage the locking member 80 with the tilt unit 78. Using the locking member 80 and serrations 84 molded in the tilt unit 78, the terminal can be pivoted and secured in various angles of inclination.

With the terminal thus mounted on the stand a cartridge can be inserted in the stand through one of the openings 24 and guided in place by the surface 35 extending from the bottom planar surface 34, so that the edge finger connector 144 of the cartridge mates with the connector 36. Engagement of the step 129 with the convex surface 76 of the stand limits insertion of the cartridges into the respective apertures 24.

The extraction of the cartridge and disassembly of the ACM from the stand can be performed by repeating the above process in a reversed order.

Figure 9:
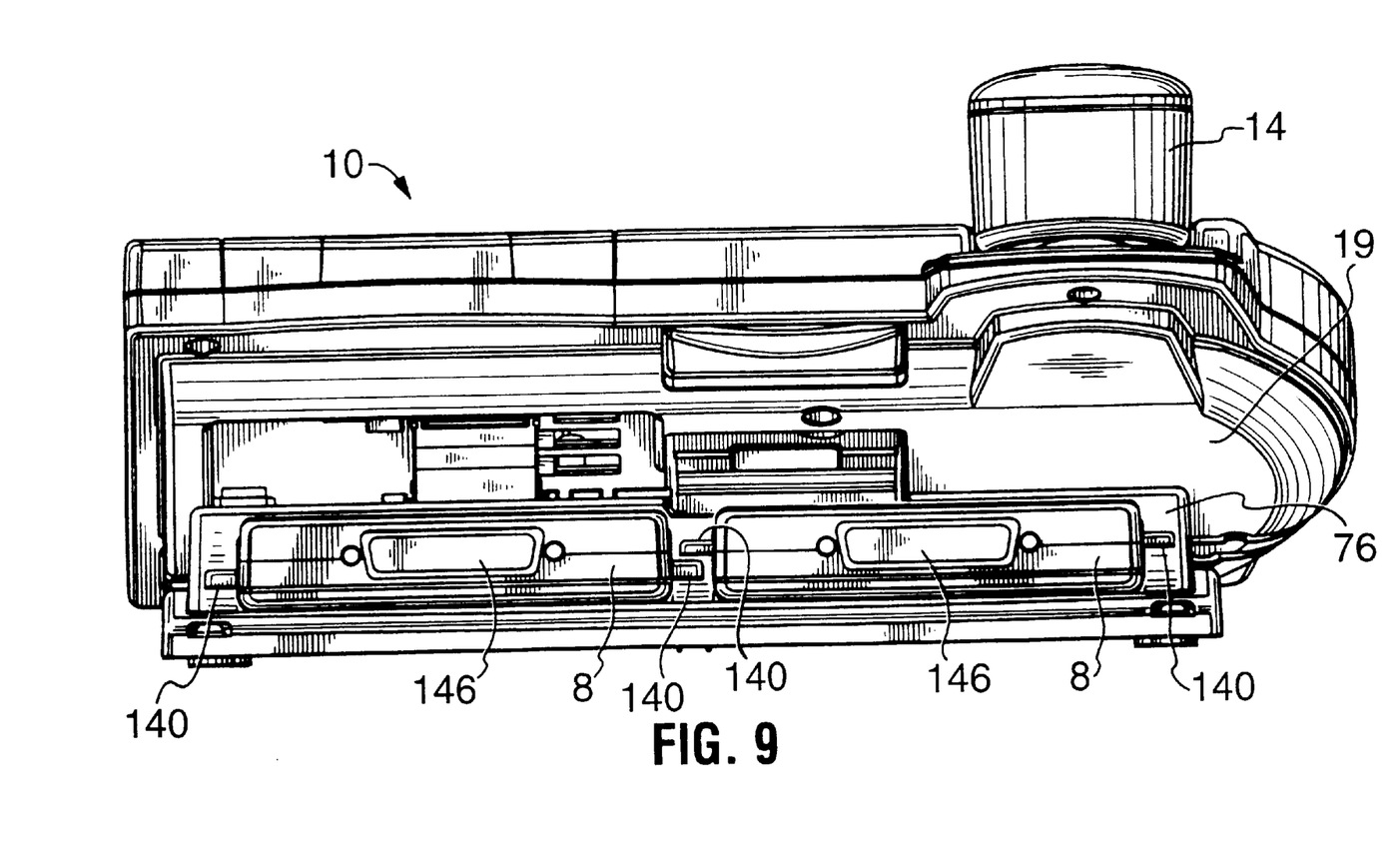
FIG. 9 is a view taken in the direction of arrow 9 in FIG. 2.

The polarizing function of the keys 140 can be understood by referring to FIG. 9 which shows two cartridges 8 fully inserted into the respective apertures 24 in the stand and mating with the respective electrical connectors 36 in the ACM. The cartridge 8 on the left of FIG. 9 is the first type and the cartridge in the right is the second type. Because there is a 5 mm difference in the key heights and because the key thickness is 4 mm, the right-hand key of the left-hand cartridge clears the left-hand key of the right-hand cartridge to permit full insertion of both cartridges. It should be apparent that any combination of cartridge types one, two or three can be accommodated simultaneously in the two side-by-side apertures except for two cartridges of the same type. This ensures that no improper pairing of identical cartridges can occur.

In the embodiment described the aperture 72 extends the entire length of one of the apertures 24 and also overlaps a portion of the other aperture 24 such that when the ACM is located in place in the stand the connectors 36 are in alignment with the left-hand end of respective apertures 24. Because the connectors 144 on the cartridges are offset, when the cartridges are inserted into the apertures 24 the connectors 144 are automatically aligned with the connectors 36. The depression 150 on each cartridge aids in gripping the cartridge and the stepped upper surface of the cartridge prevents the cartridge from being inserted upside down.

It should be apparent that, although two apertures 24 are shown, the number is not critical to the invention. There could be one aperture or more than two. Generally, however, if there is a plurality of apertures these would be aligned side by side as shown. If there were only one aperture to receive one cartridge there would only be one connector 36 on the ACM and the ACM body and aperture 72 would be correspondingly shorter. Alternatively, if there were more than two apertures 24 there would have to be a corresponding number of connectors 36 on the ACM and the ACM body and aperture 72 would have to be larger to permit alignment with the apertures 24 and permit mating of the connectors 36 with the connectors 144 of the cartridges.

Numerous modifications and variations of the presented invention are possible in light of the above teachings. It is therefore to be understood that within the scope of the appended claims, the invention may be practised otherwise than as specifically described herein. For example, it is not essential to the invention that the terminal be pivotal to different angular positions relative to the stand. However, if the stand is designed to support the terminal only at one angular position, the terminal must be movable relative to the stand to permit access to the ACM.

Furthermore, although a ribbon cable is used in the preferred embodiment of the ACM other types of flexible wiring or cable could be used.

What is claimed is:

1. A stand for supporting a separate desktop terminal and permitting interconnection of an accessory interface cartridge to the terminal, wherein the stand comprises:
   at least one first aperture, accessible when the terminal is located on the stand, for reception of at least a portion of the cartridge; and
   a second aperture for securing an accessory connection module (ACM) to the stand and in general alignment with the first aperture, whereby the ACM interconnects the terminal with the cartridge.

2. A stand according to claim 1, wherein the stand comprises a base having a front and a rear, a first surface extending from proximate the front of the base and sloping upwardly towards the rear of the base and a second substantially upright surface proximate the rear of the base, the at least one first aperture being located in the second surface and the second aperture being located in the first surface.

3. A stand according to claim 2, wherein the first surface is a support surface for the terminal.

4. A stand according to claim 3, wherein the stand is provided with pivot members located adjacent the front of the base for pivot attachment of the terminal to the stand and a tilt unit extending upwardly for locking reception in a recess in the terminal whereby the terminal may be retained at a plurality of pivoted positions.

5. A stand according to claim 4, wherein the tilt unit extends upwardly from a third surface interconnecting the first surface and the second surface.

6. A stand according to claim 3, wherein a latch is provided adjacent the second aperture for retaining the ACM in the second aperture.

7. A stand according to claim 4, wherein a latch is provided adjacent the second aperture for retaining the ACM in the second aperture.

8. A stand according to claim 6, wherein a channel is provided in the first surface in communication with the second aperture and the front of the base for reception of a conductor cable of the ACM.

9. A stand according to claim 1, wherein the at least one first aperture and the second aperture are each substantially rectangular, having a relatively long horizontal dimension and a relatively short vertical dimension.

10. A stand according to claim 9, wherein there are at least two identical first apertures side by side and wherein the second aperture is aligned with at least a portion of both first apertures.

11. A stand according to claim 10, wherein the second aperture has a horizontal dimension which is greater than the horizontal dimension of one of the two first apertures such that the second aperture has a portion aligned with the whole of one of the two first apertures and a portion aligned with a portion of the other of the two first apertures.

12. A stand according to claim 9, wherein the second aperture is formed with two spaced sides extending vertically towards the base and culminating in a floor extending between forward portion of the sides, the floor serving as a support for the ACM.

13. A stand according to claim 12, wherein at least one vertical guide rib is provided on each spaced side.

14. A stand for supporting a separate desktop terminal and permitting interconnection of an accessory interface cartridge to the terminal wherein the stand comprises:
   a substantially rectangular base having a front and a rear;
   a first surface extending from proximate the front of the base and sloping upwardly towards the rear of the base;
   a second substantially upright surface proximate the rear of the base;

pivot means on the stand for engagement with pivot means on the terminal to permit the terminal to be tilted and retained at a plurality of different tilted positions including a position in which the terminal is supported on the first surface;

at least one first elongate rectangular aperture in the second surface for reception of a portion of a cartridge; and at least one elongate rectangular aperture in the first surface, accessible when the terminal is not being supported on the first surface, for securing an accessory connection module (ACM) to the stand and in general alignment with the first aperture whereby the ACM interconnects the terminal with the cartridge.

15. In combination, a stand for supporting a separate desktop terminal and an accessory connection module (ACM) permitting interconnection of an accessory interface cartridge to the terminal, wherein the stand comprises at least one first aperture, accessible when the terminal is located on the stand, for reception of at least a portion of the cartridge and a second aperture for securing the ACM to the stand and in alignment with the first aperture; and wherein the ACM comprises at least one first electrical connector, a second electrical connector and electrical conductors extending between the first and second electrical connectors, the first electrical connector being mateable with a complementary electrical connector on the cartridge when received in the first aperture of the stand and the second electrical connector being mateable with a complementary electrical connector on the terminal when mounted on the stand.

16. A combination according to claim 15, wherein the stand comprises a base having a front and a rear, a first surface extending from proximate the front of the base and sloping upwardly towards the rear of the base and a second substantially upright surface proximate the rear of the base, the at least one first aperture being located in the second surface and the second aperture being located in the first surface.

17. A combination according to claim 16, wherein the first surface is a support surface for the terminal.

18. A combination according to claim 17, wherein the stand is provided with pivot members located adjacent the front of the base and a tilt unit extending upwardly and the terminal is provided on its underside with pivot members which cooperate with the pivot members on the stand thereby permitting pivoting connection of the terminal to the stand, the underside of the terminal having a recess lockingly receiving the tilt unit whereby the terminal may be retained at a plurality of pivoted positions.

19. A combination according to claim 18, wherein the tilt unit extends upwardly from a third surface of the stand interconnecting the first surface and the second surface.

20. A combination according to claim 17, wherein a latch is provided adjacent the second aperture and the ACM is provided with a portion cooperating with the latch to retain the ACM in the second aperture.

21. A combination according to claim 16, wherein the at least one first aperture and the second aperture are substantially rectangular and wherein the ACM comprises:

a main interface body which is substantially rectangular and has a front surface supporting the first electrical connector and a rear surface; and a flexible cable extending from the rear surface of the main interface body and being electrically connected within the main interface body to the first electrical connector and being electrically connected at its free end to the second electrical connector.

22. A combination according to claim 21, wherein the flexible cable is a ribbon cable.

23. A combination according to claim 21, wherein the front surface of the main interface body is formed with a downwardly extending lip defining a guiding mouth for reception of a cartridge.

24. A combination according to claim 22, wherein a channel is provided in the first surface of the base of the stand in communication with the second aperture and the front of the base for reception of the ribbon cable.

25. A combination according to claim 21, wherein there are two identical first apertures side by side and wherein the second aperture is aligned with a portion of both first apertures and wherein the ACM has two first electrical terminals both connected to the flexible cable, the two first electrical terminals being respectively aligned with the two first apertures when the ACM is secured in the stand.

26. An accessory connection module (ACM) for receipt in a support stand for a separate desktop terminal to permit interconnection of an accessory interface cartridge to the terminal, wherein the ACM comprises at least one first electrical connector, a second electrical connector and electrical conductors extending between the first and second electrical connectors, the first electrical connector being mateable with a complementary electrical connector on the cartridge and the second electrical connector being mateable with a complementary electrical connector on the terminal when inserted on the stand.

27. An ACM according to claim 26 further comprising:

a main interface body which is substantially rectangular and has a front surface supporting the first electrical connector and a rear surface; and a flexible cable extending from the rear surface of the main interface body and being electrically connected within the main interface body to the first electrical connector and being electrically connected at its free end to the second electrical connector.

28. An ACM according to claim 27, wherein the flexible cable is a ribbon cable.

29. An ACM according to claim 27, wherein the front surface of the main interface body is formed with a downwardly extending lip defining a guiding mouth for reception of a cartridge.

30. An ACM according to claim 27, wherein there are two identical first electrical terminals side by side both connected to the flexible cable.

31. In combination, a stand for supporting a separate desktop terminal, an accessory interface cartridge for the terminal and an accessory connection module (ACM) permitting interconnection of the cartridge to the terminal, wherein the stand comprises at least one first aperture, accessible when the terminal is located on the stand, for reception of the cartridge and a second aperture for securing the ACM to the stand and in alignment with the first aperture;

wherein the ACM comprises at least one first connector, a second electrical connector and electrical conductors extending between the first and second electrical connectors; and wherein the cartridge has an electrical connector which is mateable with the first electrical connector when the cartridge is received in the first aperture and has a further electrical connector for connection of the cartridge to an external device;

whereby the second electrical connector may be mated with a complementary electrical connector on the terminal to interconnect the cartridge to the terminal.

32. A combination according to claim 31, wherein the stand has two identical substantially rectangular first apertures side by side, wherein the ACM has two first electrical terminals connected via the electrical conductors to the second electrical terminal, the two first electrical terminals being respectively aligned with the two first apertures when the ACM is secured in the stand whereby two accessory interface cartridges may be respectively received in the first apertures and mated with the first electrical connectors, and wherein the cartridges have polarizing members preventing two cartridges of the same type from being simultaneously received in the two first apertures.

33. A combination according to claim 32, wherein the polarizing members are keys projecting from sides of the cartridges, the keys of one type of cartridge being located at a different height on the cartridge from the keys of a different type of cartridge.

* * * * *